United States Patent [19]
Masuda et al.

[11] Patent Number: 5,450,230
[45] Date of Patent: Sep. 12, 1995

[54] LIGHT SHUTTER ARRAY WITH A SUBSTANTIALLY EVEN DISTRIBUTION TRANSMITTED LIGHT

[75] Inventors: Tomohiko Masuda; Ken Matsubara, both of Takatsuki; Hirohisa Kitano, Osaka; Masazumi Morishita, Toyokawa, all of Japan

[73] Assignee: Minolta Camera Kabushiki Kaisha, Osaka, Japan

[21] Appl. No.: 962,712

[22] Filed: Oct. 19, 1992

[30] Foreign Application Priority Data

Oct. 18, 1991 [JP] Japan ................. 3-270873

[51] Int. Cl.⁶ .............. B41J 3/21; G02F 1/03; G03G 15/04
[52] U.S. Cl. .......................... 359/254; 359/87; 359/323; 219/121.68; 219/121.69
[58] Field of Search ............ 359/54, 84, 87, 89, 359/254, 255, 271, 323; 219/121.62, 121.68, 121.69; 250/229

[56] References Cited

U.S. PATENT DOCUMENTS

| | | | |
|---|---|---|---|
| 3,873,187 | 3/1975 | Brooks | 359/323 |
| 4,801,932 | 1/1989 | Takubo et al. | 359/323 |
| 4,854,678 | 8/1989 | Kitano et al. | |
| 4,887,104 | 12/1989 | Kitano et al. | |
| 4,930,876 | 6/1990 | Suzuki et al. | 359/87 |
| 5,058,250 | 10/1991 | Turnbull | 29/25.35 |
| 5,142,406 | 8/1992 | Lampert et al. | 219/121.58 |
| 5,166,492 | 11/1992 | Rivera | 219/121.68 |
| 5,198,794 | 3/1993 | Sato et al. | 219/121.68 |
| 5,233,157 | 8/1993 | Schreiber et al. | 219/121.69 |

FOREIGN PATENT DOCUMENTS

55-138881 10/1980 Japan.
63-189268 8/1988 Japan.

*Primary Examiner*—Nelson Moskowitz
*Attorney, Agent, or Firm*—Burns, Doane, Swecker & Mathis

[57] ABSTRACT

The present invention relates to a light shutter array which has shutter elements made of an electro-optical material. The quantity of light transmitted by each shutter element in the array is measured, and a limit is set relative to the smallest measured value such that the transmitted light quantity distribution of the light shutter array would be regarded substantially even if all shutter elements transmitted light within the limit. To achieve such a substantially even distribution, shutter elements which transmit light over the limit are subjected to trimming. Since trimmed regions on a shutter element do not transmit light, the quantity of light transmitted through a trimmed shutter element is lowered in proportion to the area of the trimmed region. Alternatively, individual electrodes and/or portions of a common electrode corresponding to the shutter elements which transmit light over the limit are trimmed. As a result, electric fields generated in the shutter elements are weakened, and the polarizing effects of the shutter elements are weakened. Consequently, the quantity of light transmitted through those shutter elements is lowered.

11 Claims, 11 Drawing Sheets

FIG. 14b LIGHT QUANTITY (LINE A)

FIG. 14c LIGHT QUANTITY (LINE B)

FIG. 14d LIGHT QUANTITY (TOTAL)

DISTANCE (X-DIRECTION)

FIG. 15a

FIG. 15b
LIGHT QUANTITY
(LINE A)

FIG. 15c
LIGHT QUANTITY
(LINE B)

FIG. 15d
LIGHT QUANTITY
(TOTAL)

DISTANCE (X-DIRECTION)

FIG. 16a

FIG. 16b LIGHT QUANTITY (LINE A)

FIG. 16c LIGHT QUANTITY (LINE B)

FIG. 16d LIGHT QUANTITY (TOTAL)

DISTANCE (X-DIRECTION)

5,450,230

LIGHT SHUTTER ARRAY WITH A SUBSTANTIALLY EVEN DISTRIBUTION TRANSMITTED LIGHT

BACKGROUND OF THE INVENTION

1. Field of the Invention

The present invention relates to a light shutter array which is employed in a write head of an image forming apparatus such as a printer or a facsimile, and more particularly to a light shutter array which is composed of light shutter elements made of a material having an electro-optical effect.

2. Description of Related Art

Conventionally, a write head comprising a light shutter array which is composed of hundreds of light shutter elements made of an electro-optical material such as PLZT. The light shutter elements are connected to a common electrode at one end and to respective individual electrodes at the other end.

The light shutter elements are processed by machining or the like, and the light shutter elements vary in light transmitting area because of insufficient accuracy of the movement of the machining tool. The common electrode and the individual electrodes are processed by vapor deposition, sputtering or the like, and the electrodes vary in thickness because of variation in distance at the time of vapor deposition or sputtering. The variation of the light shutter elements in light transmitting area results in variation of the quantity of light transmitted through the light shutter elements. The variation in electrode thickness causes electric fields generated in the light shutter elements to be of different strengths, also resulting in variation of the quantity of light transmitted through the light shutter elements. Consequently, when an image is formed with a write head employing the light shutter array, problems such as toner deposition on blank regions, thinning of lines, and vertical streaks occur.

Japanese Patent Laid Open Publication No. 63-189268 intends to solve these problems. However, a light shutter array disclosed by tile Japanese Publication requires a complicated electric control circuit, thereby making the whole apparatus large and expensive.

SUMMARY OF THE INVENTION

An object of the present invention is to provide a light shutter array having an even distribution of transmitted light without requiring a complicated electric control circuit.

Thus, a light shutter array according to the present invention has at least one line of shutter elements made of an electro-optical material; a common electrode disposed at one side of the line of shutter elements; and individual electrodes disposed at the other side of the line of shutter elements.

A limit is set within which the transmitted light quantity distribution of the light shutter array is regarded to be substantially even. Shutter elements which transmit light over the limit are subjected to laser trimming or the like so that their light transmitting portions will be narrowed. More specifically, trimming is performed by changing the quality of trimmed regions using a photochemical reaction or a thermal metamorphosis, or by removing the trimmed regions. Because the trimmed regions do not transmit light, the light transmitting portions of the shutter elements are narrowed and the quantities of light transmitted through the shutter elements are lowered. The area of a trimmed region on a given shutter element should be in accordance with the amount by which the transmitted light quantity of that shutter element exceeds the limit.

Alternatively, portions of the common electrode and/or individual electrodes which correspond to the shutter elements which transmit light over the limit are subjected to laser trimming or the like. The portions of the common electrode and/or the individual electrodes are partly removed by the laser trimming, and thereby, electric fields generated in the shutter elements are weakened. Accordingly, the polarizing effect of the shutter elements are weakened, and the quantities of light transmitted through the shutter elements are lowered.

BRIEF DESCRIPTION OF THE DRAWINGS

This and other objects and features of the present invention will be apparent from the following description with reference to the accompanying drawings, in which:

FIGS. 1 through 6 show a light shutter array which is a first embodiment of the present invention;

FIGS. 7 through 11 show a light shutter array which is a second embodiment of the present invention;

FIGS. 12 through 16 show a light shutter array which is a third embodiment of the present invention;

DETAILED DESCRIPTION OF THE PREFERRED EMBODIMENTS

Some exemplary light shutter arrays according to the present invention are hereinafter described with reference to the accompanying drawings. In the following embodiments, the same parts and members are denoted by the same numbers and marks.

First Embodiment: FIGS. 1–6

Figure 1:
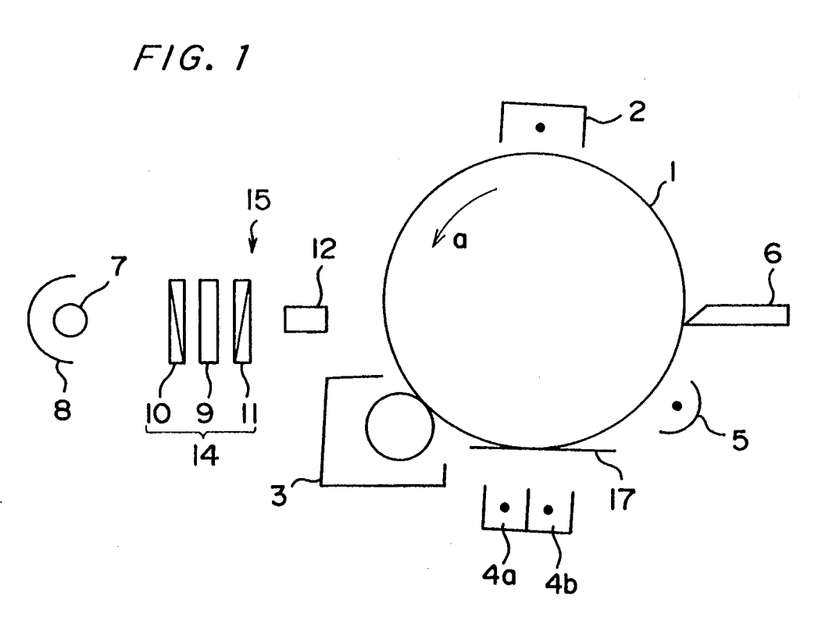
FIG. 1 is a schematic view of a printer employing the light shutter array.

FIG. 1 is a schematic view of a printer which has a write head employing light shutter arrays. A photosensitive drum 1 is provided to be rotatable in a direction indicated with arrow a. Around the photosensitive drum 1 are an electric charger 2, an image writing device 15, a developing device 3, a transfer charger 4a, a separation charger 4b, an eraser lamp 5 and a cleaning device 6. The photosensitive drum 1 has a photoconductive layer on its surface, and the photoconductive layer is uniformly charged after the photosensitive drum 1 rotates past the eraser lamp 5 and the electric charger 2. Then, the photosensitive drum 1 is exposed to a light coming from the image writing device 15 and obtains an electrostatic latent image on the photoconductive layer.

A recording sheet 17 is fed to the transfer charger 4a in synchronization with the electrostatic latent image formed on the photosensitive drum 1, and the image is transferred to the sheet 17 as a toner image. Thereafter, the sheet 17 is separated from tile photosensitive drum 1 by the separation charger 4b and fed to a fixing device (not shown). Meanwhile, the eraser lamp 5 and the cleaning device 6 remove residual toner and charge from the photosensitive drum after the image transfer, and thus the photosensitive drum 1 is readied for the next image formation.

The image writing device 15 mainly consists of a light source 7, a reflecting mirror 8, a write head 14 and an imaging lens array 12. A halogen lamp, a fluorescent lamp, a metal halide lamp or the like is used as the light source 7. Because the reflecting mirror 8 is disposed at the rear of the light source 7, a light radiated from the light source 7 progresses forward to the write head 14. The write head 14 comprises light shutter arrays 9, a polarizer 10 and an analyzer 11.

Figure 2:
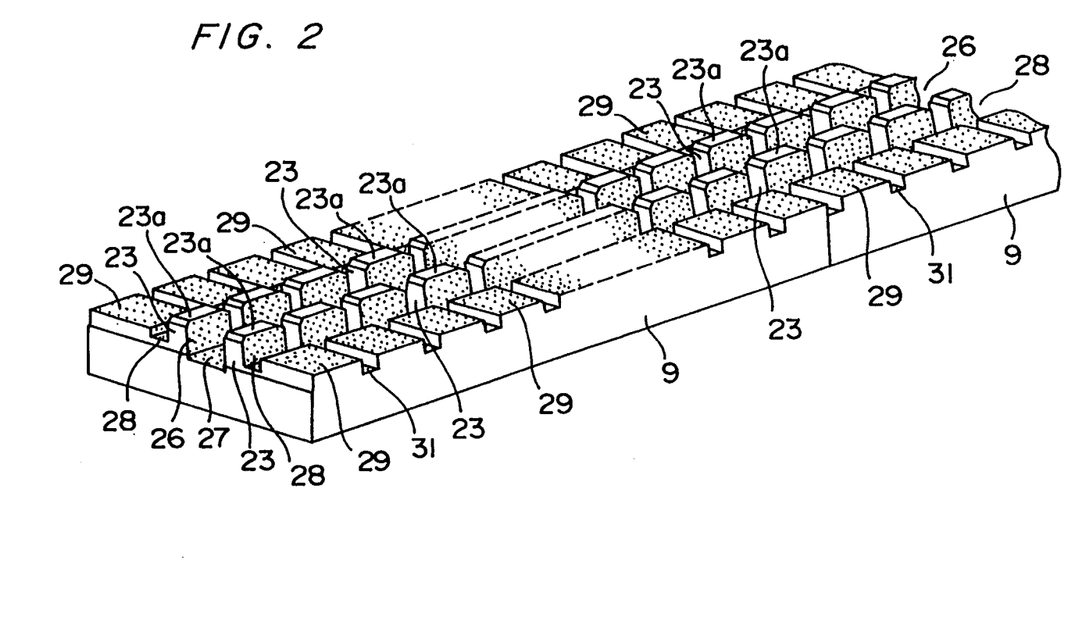
FIG. 2 is a perspective view of the light shutter array.

FIG. 2 shows the light shutter arrays 9. The light shutter arrays 9, which are made of PLZT or the like, are joined together in a line. In the case of FIG. 2, rectangular parallelopiped shutter elements 23 are arranged in two parallel lines in the center of the light shutter arrays 9. The upper facet of each shutter element 23 is a light transmitting facet 23a. A groove 26 is formed between the two lines of shutter elements 23, and a common electrode 27 is provided on the groove 26. Outside of the two lines of shutter elements 23, grooves 28 are formed, and individual electrodes 29 are provided on the grooves 28 so as to be coupled with the respective shutter elements 23. The individual electrodes 29 are extended outward, and the extensions are connected with external circuits. The shutter elements 23, the individual electrodes 29, grooves 31 among the individual electrodes 29, and the above-described grooves 26 and 28 are all formed by machining using a diamond cutter. The common electrode 27 and the individual electrodes 29 are finished by sputtering or vapor deposition of aluminum.

The polarizer 10 and the analyzer 11 have mutually perpendicular polarizing directions. The shutter elements 23 are selectively impressed with a specified voltage in accordance with image data. Only light transmitted through the shutter elements 23 impressed with the specified voltage passes through the analyzer 11. Then, the light is converged by the lens array 12 and imaged on the photosensitive drum 1. A distributed index lens array or the like is used as the lens array 12.

The following describes how to even the transmitted light quantity distribution of tile light shutter arrays 9.

Figure 3:
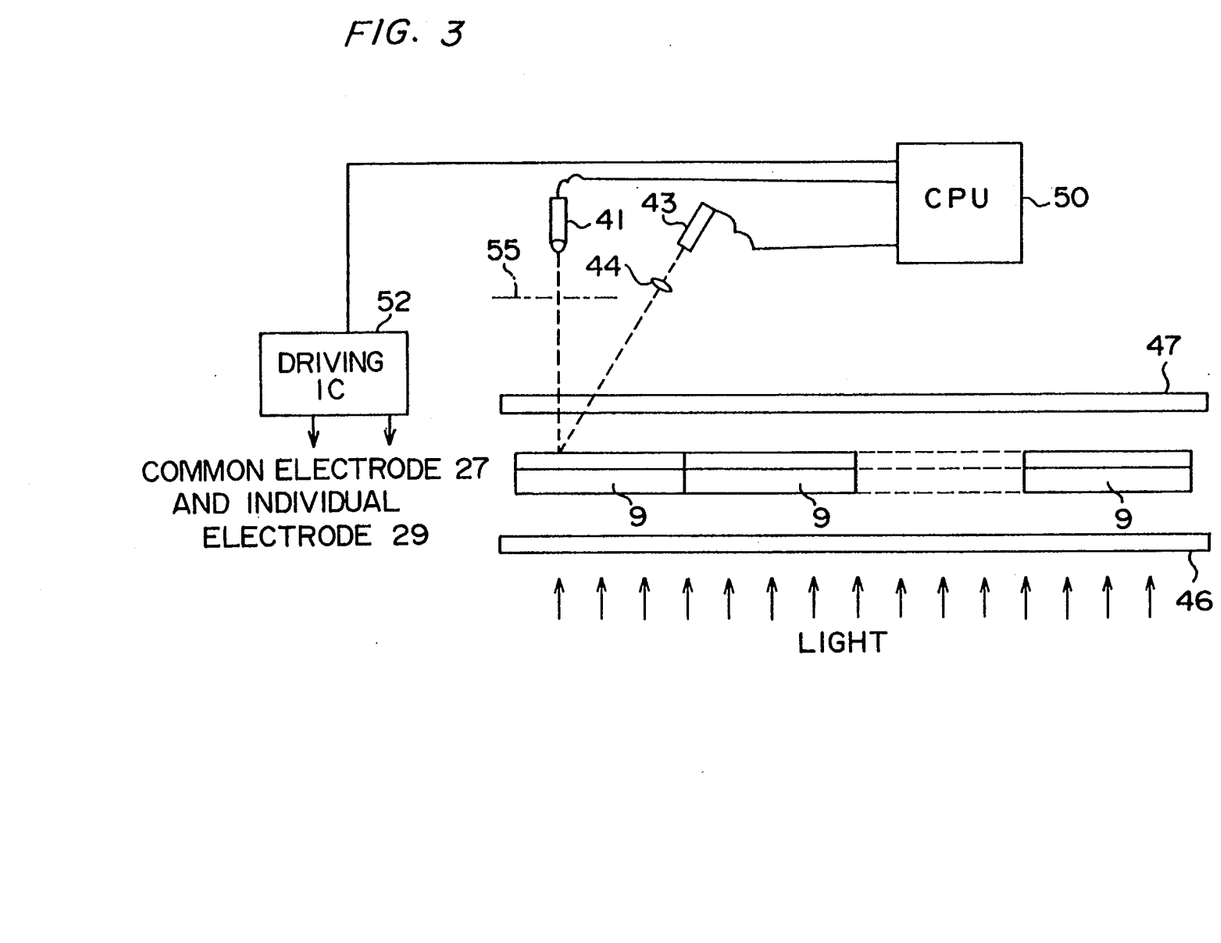
FIG. 3 is a schematic view of an exemplary light shutter array trimming machine.

The first embodiment intends to provide light shutter arrays 9 which have an even distribution of transmitted light by decreasing the light transmitting areas of shutter elements 23 which transmit a large quantity of light. The light shutter arrays 9 are set in a trimming machine as shown in FIG. 3. The trimming machine comprises a light source (not shown) which irradiates the light shutter elements 23 uniformly, a photosensor 41 for measuring the quantity of light transmitted through each light shutter element 23, a laser 43 which carries out trimming, a lens 44 for converging the laser beam, polarizers 46 and 47 which are crossed Nicols, a driving mechanism (not shown) for moving tile photosensor 41, the laser 43 and the lens 44, a CPU 50 for controlling the trimming machine, and a driving IC 52 for impressing each shutter element 23 with a voltage.

After setting the light shutter arrays 9 in the trimming machine, the CPU 50 is started. The CPU 50 sends a moving signal to the driving mechanism to control the movement of the photosensor 41, the laser 43 and the lens 44 such that the quantities of light transmitted through the shutter elements 23 will be measured one after another. When the photosensor 41, the laser 43 and the lens 44 are moved to a position to measure the quantity of light transmitted through a shutter element 23, tile CPU 50 sends a drive signal to the driving IC 52. The driving IC 52 impresses a specified voltage on the common electrode 27 and the individual electrode 29 connected with the shutter element 23 to cause an electric field in tile shutter element 23. The voltage impressed on the electrodes 27 and 29 is, for example, a half-wave voltage which enables the shutter element 23 to transmit a maximum quantity of light. Only light transmitted through the shutter element 23 impressed with the specified voltage passes through the polarizer 47 and reaches the photosensor 41. The photosensor 41 measures the quantity of light, and the measured values are stored in the CPU 50.

Further, there is another way of measuring the quantity of light transmitted through each shutter element 23. All the shutter elements 23 are kept impressed with the voltage, while a mask 55 is provided in front of the photosensor 41 as shown in FIG. 3 so that unnecessary light will not enter the photosensor 41.

When all tile measured values are stored in tile CPU 50, the CPU 50 determines smallest value. Then, the CPU 50 compares the smallest value with the other values one by one. A limit is set on the excess of a measured value over the smallest value such that the transmitted light quantity distribution of the light shutter arrays 9 is regarded substantially even within the limit. If the measured value of a shutter element 23 is larger than the smallest value by more than the limit, the moving signal is sent to the driving mechanism so that the shutter element 23 will be subjected to trimming by use of the laser 43. When the laser 43 and the lens 44 are moved to a position to perform trimming of the shutter element 23, the CPU 50 sends the laser 43 a trimming signal indicating an adjustment value calculated from the comparison of the measured value of the shutter element 23 with the smallest value. A laser beam emitted from the laser 43 irradiates a part of the light transmitting facet 23a of the shutter element 23, and thus trimming is performed. More specifically, if an excimer laser is used as the laser 43, the irradiation causes a photo-chemical reaction of the irradiated part. If a carbon dioxide laser is used as the laser 43, the irradiation causes a thermal metamorphosis of tile irradiated part. In either case, the part irradiated by the laser beam does not transmit light, and the light transmitting area of the shutter element 23 becomes smaller. Accordingly, the quantity of light transmitted through the shutter element 23 becomes smaller. The narrowing amount of the light transmitting area of each shutter element 23 should be determined in accordance with the excess of tile measured value over the limit. Thus, it is possible to even the transmitted light quantity distribution of the light shutter arrays 9 as a whole.

Figure 4:
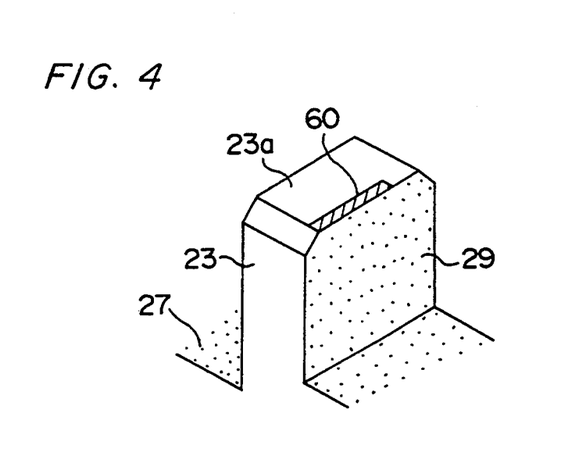
FIG. 4 is an enlarged perspective view of a light shutter element showing an exemplary way of trimming the shutter element.
Figure 5:
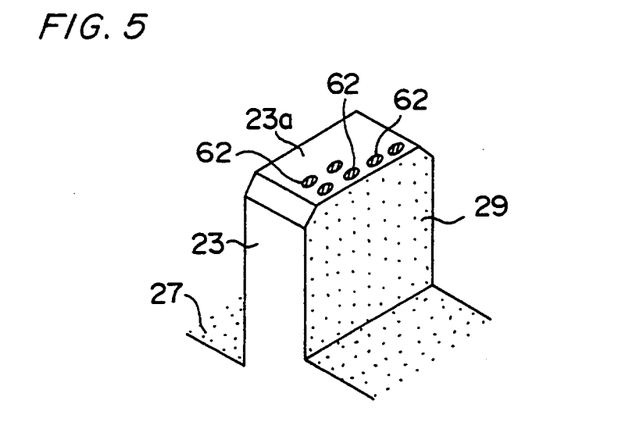
FIG. 5 is an enlarged perspective view of a light shutter element showing another exemplary way of trimming the shutter element.
Figure 6:
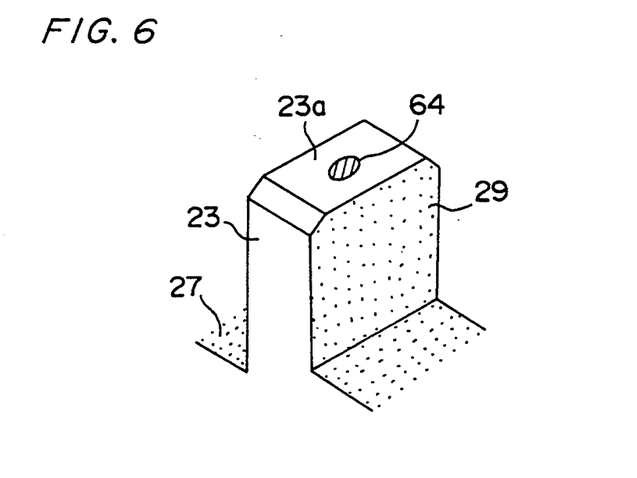
FIG. 6 is an enlarged perspective view of a light shutter element showing another exemplary way of trimming the shutter element.

FIGS. 4 through 6 show examples of trimming. FIG. 4 shows linear trimming. The lowering of the quantity of light transmitted through the shutter element 23 is controlled by changing the length and the width of a linear trimmed region 60. FIG. 5 shows dot trimming. The lowering of the quantity of light transmitted through the shutter element 23 is controlled by changing the number of dot trimmed regions 62. FIG. 6 shows circular trimming. The lowering of the quantity of light transmitted through the shutter element 23 is controlled by changing the diameter of a circular trimmed region 64.

Second Embodiment: FIGS. 7-11

A second embodiment of the present invention comprises light shutter arrays similar in structure to those of the first embodiment shown in FIG. 2. Thus a description of the structure of the is omitted here. The same parts and members as those of the first embodiment are denoted by the same numbers and marks. The second embodiment intends to provide light shutter arrays which have an even light transmittance distribution by decreasing tile areas of individual electrodes 29 connected with shutter elements 23 which transmit a large quantity of light. Also, decreasing the areas of portions of the common electrode 27 corresponding to the shutter elements 23 which transmit a large quantity of light yields the same effect. Furthermore, decreasing the areas of both tile individual electrodes 29 and the portions of the common electrode 27 corresponding to the shutter elements 23 which transmit a large quantity of light yields the same effect.

The following describes how to even the transmitted light quantity distribution of the light shutter arrays. As described in the first embodiment, after setting the light shutter arrays in the trimming machine as shown in FIG. 3, the quantity of light transmitted through each shutter element 23 is measured. The CPU 50 finds out the smallest value of the measured values and compares the smallest value with the other values. A limit is set on the excess of a measured value over the smallest value such that the transmitted light quantity distribution of the light shutter arrays is regarded to be substantially even within the limit. If the measured value of a shutter element 23 is larger than the smallest value by more than the limit, the individual electrode 29 connected with the shutter element 23 will be subjected to trimming by use of the laser 43. FIGS. 7 through 11 show examples of trimming.

Figure 7:
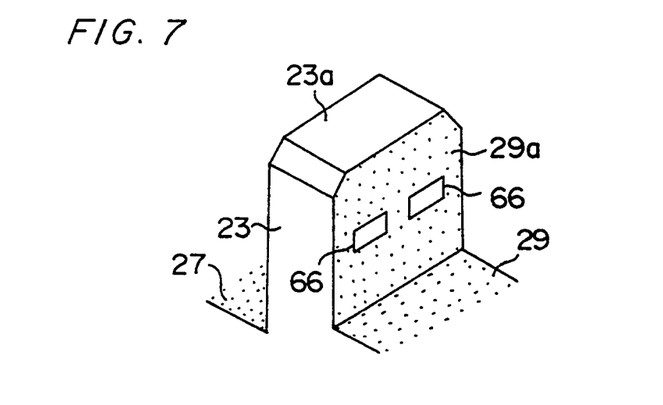
FIG. 7 is an enlarged perspective view of a light shutter element showing an exemplary way of trimming the corresponding individual electrode.
Figure 8:
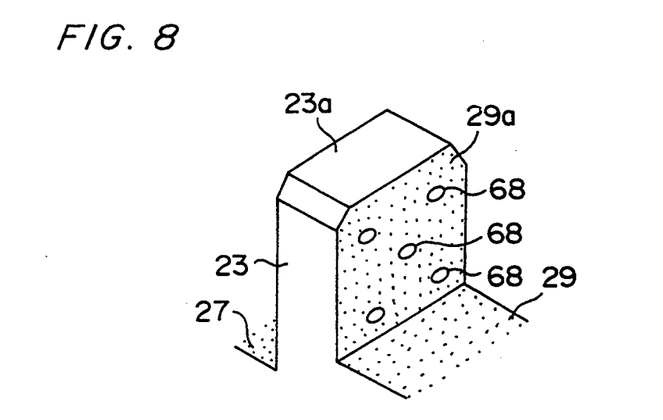
FIG. 8 is an enlarged perspective view of a light shutter element showing another exemplary way of trimming the corresponding individual electrode.
Figure 9:
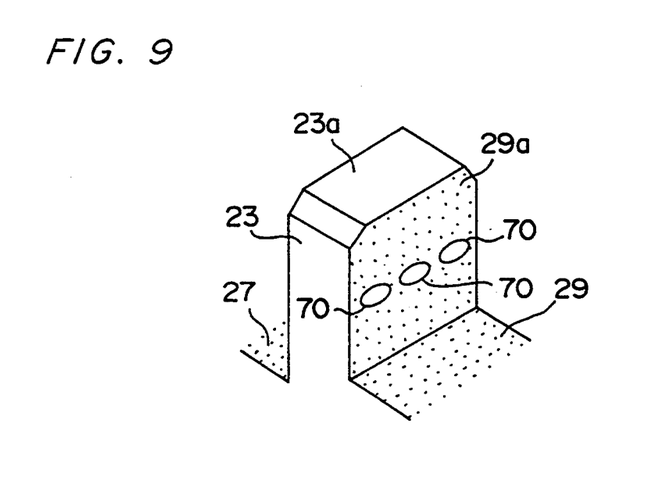
FIG. 9 is an enlarged perspective view of a light shutter element showing another exemplary way of trimming the corresponding individual electrode.

FIGS. 7 through 9 show examples in which the area of tile individual electrode 29 is decreased by partly removing its main portion 29a. The electric field generated in the shutter element 23 becomes weaker, and the light transmittance of the shutter element 23 is lowered. FIG. 7 shows linear trimming. The lowering of the quantity of light transmitted through the shutter element 23 is controlled by changing the lengths and the widths of linear trimmed regions 66. FIG. 8 shows dot trimming. The lowering of the quantity of light transmitted through the shutter element 23 is controlled by changing the number of dot trimmed regions 68. FIG. 9 shows circular trimming. The lowering of the quantity of light transmitted through the shutter element 23 is controlled by changing the diameters of circular trimmed regions 70.

Figure 10:
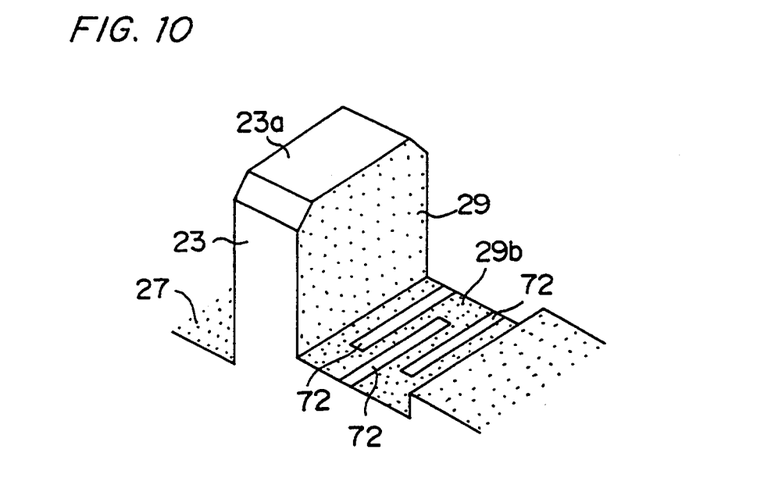
FIG. 10 is an enlarged perspective view of a light shutter element showing another exemplary way of trimming the corresponding individual electrode.
Figure 11:
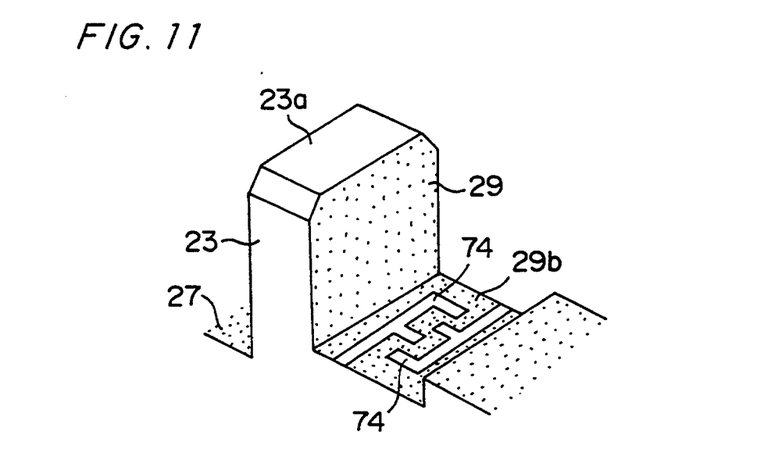
FIG. 11 is an enlarged perspective view of a light shutter element showing another exemplary way of trimming the corresponding individual electrode.

FIGS. 10 and 11 show examples in which the resistance of the individual electrode 29 is heightened by partly removing its extension 29b. The electric field generated in the shutter clement 23 becomes weaker, and the quantity of light transmitted through the shutter element 23 is lowered. FIG. 10 shows linear trimming. The lowering of the quantity of light transmitted through the shutter element 23 is controlled by changing the lengths of linear trimmed regions 72 and the intervals among them. FIG. 11 shows pattern trimming. The lowering of the quantity of light transmitted through the shutter element 23 is controlled by changing the lengths of patterned trimmed regions 74 and the intervals among them.

Third Embodiment: FIGS. 12-16

Figure 12:
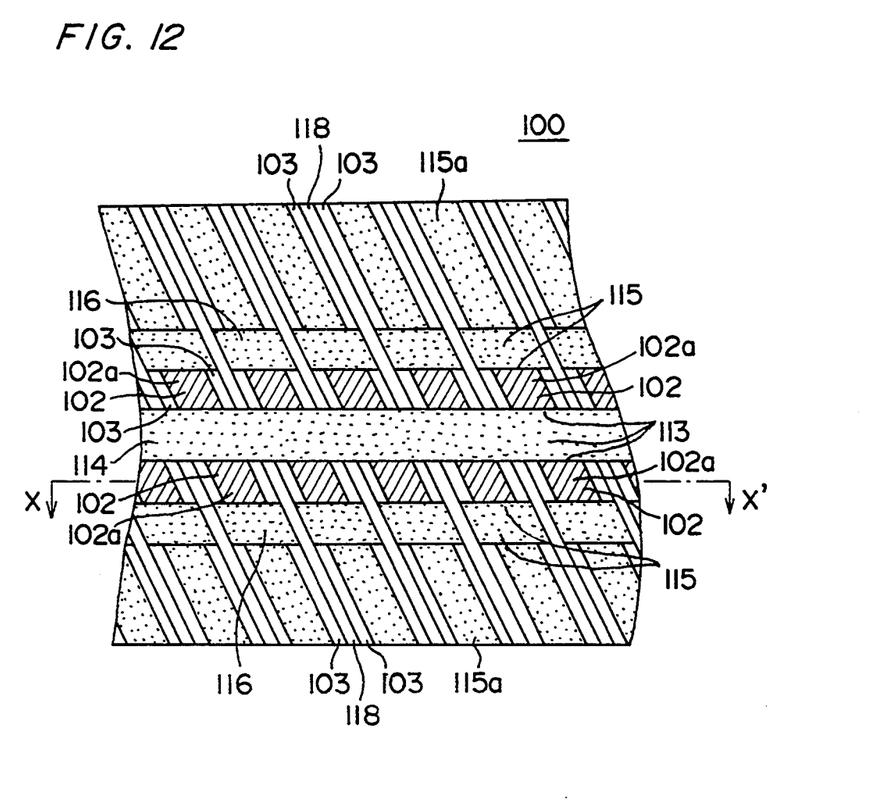
FIG. 12 is a partial plan view of the light shutter array.
Figure 13:
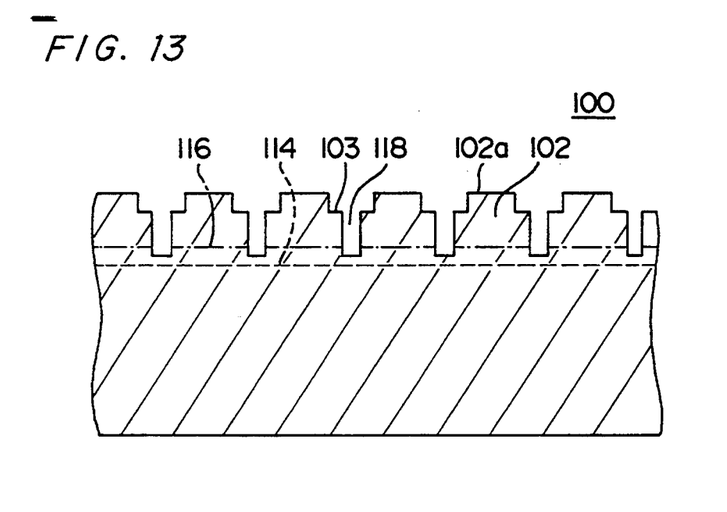
FIG. 13 is an elevational sectional view of the light shutter array, taken along the line X—X' indicated in FIG. 12.

FIGS. 12 and 13 show a light shutter array 100 which is a third embodiment of the present invention. The light shutter array 100 has shutter elements 102 staggered in two lines in the center. An upper facet of each shutter element 102 has cutouts 103 at both sides in respect to the direction of the lines, and the light transmitting facet 102a (shadowed regions in FIG. 12) of each shutter element 102 is shaped into a parallelogram. A common electrode 113 is provided on a groove 114 formed between the lines of shutter elements 102. Individual electrodes 115 are provided on grooves 116 formed outside of the lines of shutter elements 102. The individual electrodes 115 are extended outward, and the extensions 115a are connected with external circuits. The extensions 115a of the individual electrodes 115 are divided by the grooves 103. Further, in order to make the shutter elements 102 and the individual electrodes 115 in desired sizes and to separate them from each other, grooves 118 are formed by machining.

Figure 14A:
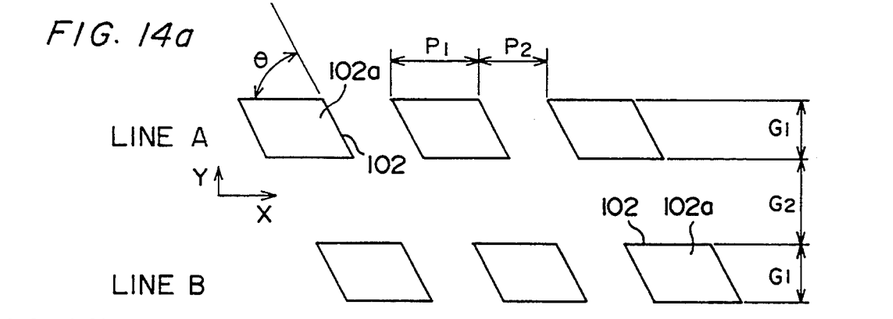
FIG. 14a is a plan view of the light shutter array showing the arrangement of shutter elements.

FIG. 14a shows the arrangement of the shutter elements 102. The light shutter array 100 is made of PLZT which is made of lead, zirconium and titanium at a ratio of 9 mol:65 mol:35 mol. The light shutter array 100 has a thickness of 0.5 mm. Each shutter element 102 has a width $G_1$ of 50 $\mu$m and a length $P_1$ of 90 $\mu$m. The shutter elements 102 are arranged such that the angle $\phi$ is 64 degrees, the interval $G_2$ between the two lines A and B of shutter elements 102 is 119 μm, and the intervals $P_2$ among shutter elements 102 in a line is 79μm. Viewed from the direction of arrow Y, the lines A and B of shutter elements 102 overlap by a specified amount. The light transmitting facet 102a of each shutter element 102 transmits light perpendicularly. Two polarizers (not shown) are provided with the light shutter array 100 in-between. The polarizers are crossed Nicols, and the polarizing directions are aslant at an angle of 45 degrees to the direction of an electric field generated in each shutter element 102.

Figure 14B:
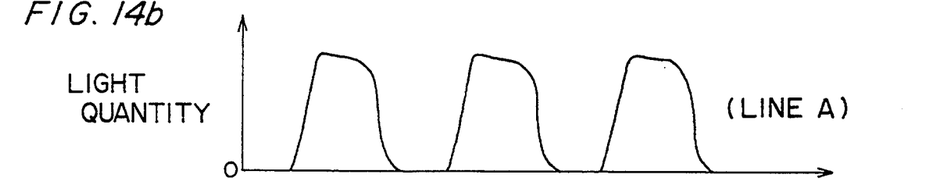
FIGS. 14b, 14c and 14d are graphs showing transmitted light quantity distributions of the shutter elements before trimming.
Figure 14C:
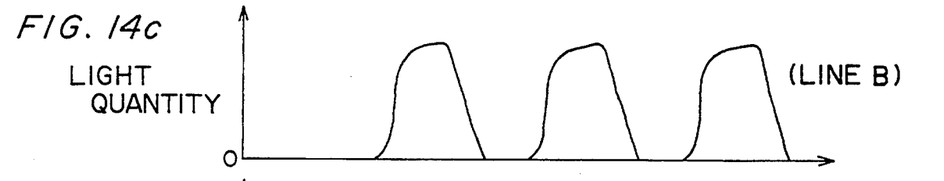
Figure 14D:
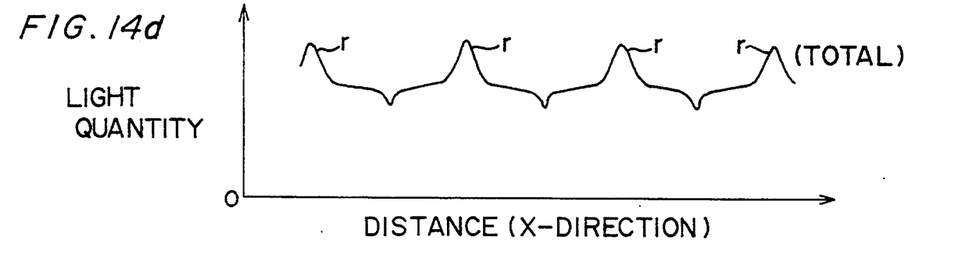

FIGS. 14b, 14c and 14d show the transmitted light quantity distribution of tile light shutter array 100. FIG. 14b shows the transmitted light quantity distribution of the line A of shutter elements 102. FIG. 14c shows the transmitted light quantity distribution of the line B of shutter elements 102. FIG. 14d shows the transmitted light quantity distribution of both lines A and B of shutter elements 102. Each shutter element 102 has an asymmetrical transmitted light quantity distribution (see FIGS. 14b and 14c), and in the graph of FIG. 14d, steep protrusions r appear, at double the pitch of shutter elements 102 in each of the lines A and B, at places corresponding to the grooves 103 and 118. This may be due to a residual stress created in the shutter elements 102 in forming the grooves 103 and 108.

Next, laser trimming of the light transmitting facet 102a of each light shutter element 102 to even the transmitted light quantity distribution of the light shutter array 100 is described. An excimer laser is used, and the laser is controlled to radiate a laser beam having a beam spot of 10 μm. The laser beam irradiates the light transmitting facet 102a of each light shutter element 102 to trim a linear region 130 (shadowed area in FIG. 15a) having a width of 4μm along the side which is at an obtuse angle to the common electrode 113. In this case, two methods are possible: exposing the region 130 to a strong laser beam to remove the regions 130; and exposing the region 130 to a weak laser beam to change the region 130 in quality.

Figure 15A:
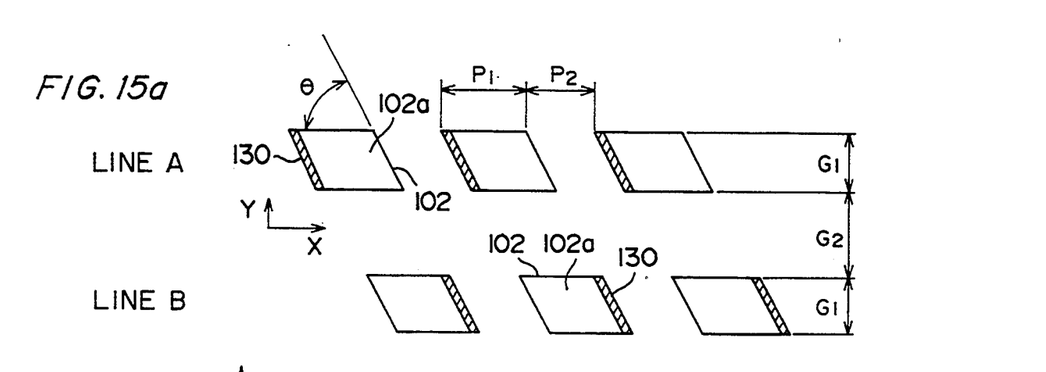
FIG. 15a is a plan view of the light shutter array showing trimmed regions.
Figure 15B:
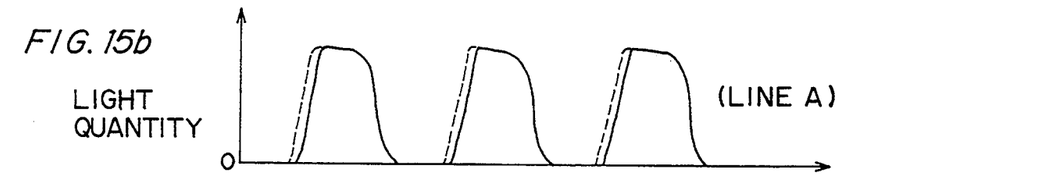
FIGS. 15b, 15c and 15d are graphs showing transmitted light quantity distributions of the shutter elements after the trimming.
Figure 15C:
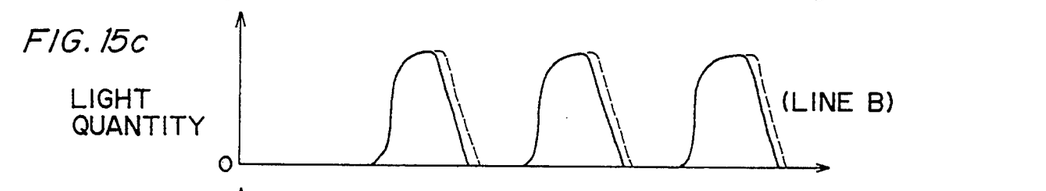
Figure 15D:
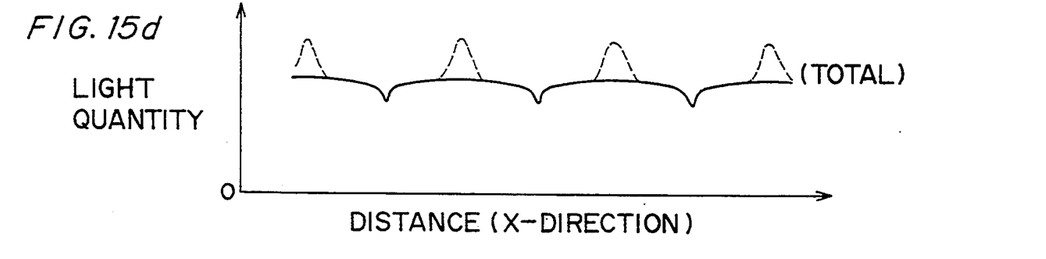

FIGS. 15b, 15c and 15d show the transmitted light quantity distribution of the light shutter array 100 before and after the laser trimming. The solid lines and the dotted lines in the graphs indicate the distribution after the laser trimming and the distribution before the laser trimming respectively. FIG. 15b shows the transmitted light quantity distribution of the line A of shutter elements 102. FIG. 15c shows the transmitted light quantity distribution of the line B of shutter elements 102. FIG. 15d shows the transmitted light quantity distribution of both lines A and B of shutter elements 102. The trimmed region 130 of each shutter element 102 does not transmit light, and the transmitted light quantity distributions of the lines A and B of shutter elements 102 are changed as shown in FIGS. 15b and 15c respectively. Accordingly, the transmitted light quantity distribution of the light shutter array 100 as a whole becomes even as shown in FIG. 15d. Preferably, the area of the trimmed region 130 is determined according to the shape of the shutter elements 102 (specifically, angle $\phi$, width $G_1$ and length $P_1$), the density of the shutter elements 102, the machining/processing conditions of the shutter elements 102 and the apparatus in which the light shutter array 100 is to be installed.

FIGS. 16a through 16d show laser trimming of a light shutter array 102 which has another transmitted light quantity distribution. Before the laser trimming, in each line of A and B, shutter elements which have a higher light transmittance and shutter elements which have a lower light transmittance are arranged alternately (see dotted lines in FIGS. 16b, 16c and 16d). In this case, the light transmitting facet 102a of every shutter element 102 is trimmed at the side which is at an obtuse angle to the common electrode 113, and in addition, the light transmitting facet 102a of each of the shutter elements which has a higher light transmittance is trimmed at the side facing the common electrode 113.

Figure 16A:
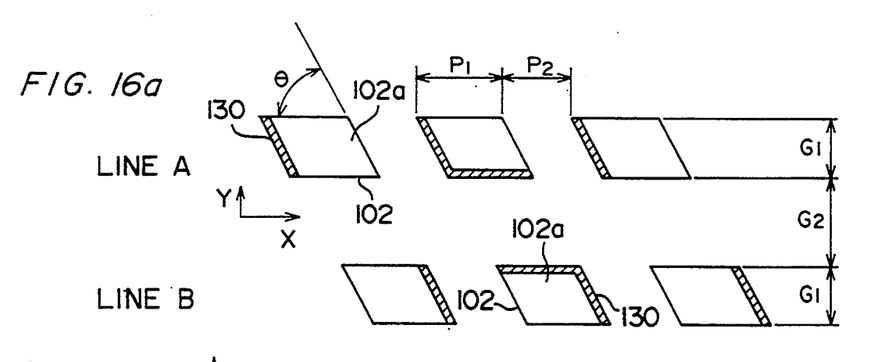
FIG. 16a is a plan view of a light shutter array showing the arrangement of shutter elements and trimmed regions.

Concerning the trimming of the light transmitting facet 102a of a shutter element 102 at the side facing the common electrode 113, the effect of the trimming on the quantity of light transmitted through the shutter element 102 depends on the area of the trimmed region and the depth of the trimming. An electric field occurs in a shutter element 102 when a voltage is impressed between the common electrode 113 and the corresponding individual electrode 115. As the side facing the common electrode 113 is being trimmed deeply, the area of the common electrode 113 is decreased, and thereby the electric field in the shutter element 102 is weakened. Consequently, the quantity of light transmitted through the shutter element 102 is lowered. This logic is applicable to trimming of tile light transmitting facet 102a at the side facing to the individual electrode 115 and to trimming of the light transmitting facet 102a at the center.

Figure 16B:
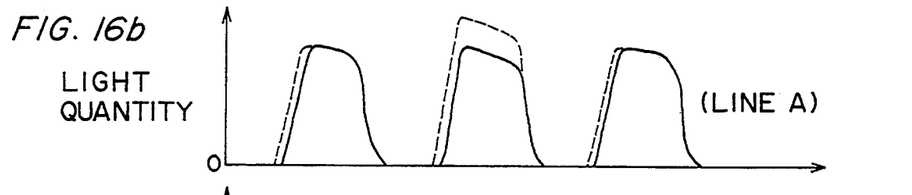
FIGS. 16b, 16c and 16d are graphs showing transmitted light quantity distributions of the shutter elements before and after trimming.
Figure 16C:
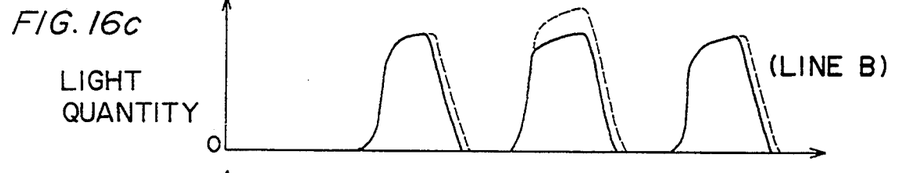
Figure 16D:
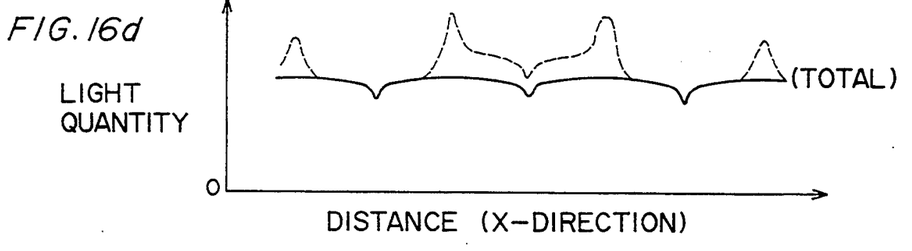

The trimmed regions 130 of the shutter elements 102 do not transmit light, and accordingly, the transmitted light quantity distributions of the shutter elements 102 in the lines A and B are changed as shown in FIGS. 16b and 16c. Accordingly, the transmitted light quantity distribution of the light shutter array 100 as a whole becomes even as shown in FIG. 16d.

If the shutter elements 102 have high light transmittance regions locally, trimming of the shutter elements 102 only at those regions may yield a sufficient effect.

Other Embodiments

Although the present invention has been described in connection with the preferred embodiments above, it is to be noted that various changes and modifications are possible to those who are skilled in the art. Such changes and modifications are to be understood as being within the scope of the invention.

In the above embodiments, the trimming is performed consecutively after the measurement of the light transmittances of the shutter elements before installation of the light shutter array in an image forming apparatus. However, it is possible to perform the trimming of the light shutter array after installation of the light shutter array in an image forming apparatus. In this case, the measured data are kept in the CPU until they are used for the trimming, and the trimming can be carried out not only to even the transmitted light quantity distribution of the light shutter array but also to adjust the light transmittance of the light shutter array to the luminous intensity distribution of the light source and errors of the lenses of the image forming apparatus.

In the embodiments above, the transmitted light quantity distribution of the light shutter array is adjusted by laser trimming of the light transmitting facets of shutter elements or electrodes. However, the adjustment of the transmitted light quantity distribution can be performed by machining with a cutting tool or the like. Also, in the first and the third embodiments, it is possible, to cover appropriate portions of the light shutter array with a mask in order to achieve an even distribution of transmitted light. If so, the masking will be more effective if regions where light leaks, such as the grooves between the shutter elements, are masked as well.

What is claimed is:

1. A method for providing an even distribution of transmitted light in a light shutter array having at least one line of shutter elements made of an electro-optical material, comprising the steps of:

measuring the quantity of light transmitted through each of said shutter elements;

determining a specified value for the quantity of light transmitted through each shutter element; and decreasing a light transmitting area of each shutter element which has a transmitted light quantity over said specified value.

2. A method as claimed in claim 1, wherein a light transmitting area is decreased by laser trimming a linear region on the light transmitting area, said linear region having a length and a width appropriate to achieve a specified amount of decrease.

3. A method as claimed in claim 1, wherein a light transmitting area is decreased by laser trimming dot regions on the light transmitting area, said dot regions being appropriate in size and number to achieve a specified amount of decrease.

4. A method as claimed in claim 1, wherein a light transmitting area is decreased by laser trimming a circular region on the light transmitting area, said circular region having a diameter appropriate to achieve a specified amount of decrease.

5. A method as claimed in claim 1, wherein a light transmitting area is decreased by partly covering the light transmitting area with a light blocking mask.

6. A method as claimed in claim 1, wherein said specified value is determined in accordance with a minimum measured quantity of light transmitted through said shutter elements.

7. A method for providing an even distribution of transmitted light in a light shutter array having at least one line of shutter elements made of an electro-optical material, a common electrode disposed at one side of the line of shutter elements, and individual electrodes disposed at the other side of the line of shutter elements, comprising the steps of:

measuring the quantity of light transmitted through each of said shutter elements;

determining a specified value for the quantity of light transmitted through each shutter element; and decreasing in area an individual electrode and/or a portion of the common electrode corresponding to each shutter element which has a transmitted light quantity over said specified value.

8. A method as claimed in claim 7, wherein an individual electrode and/or a portion of the common electrode is decreased in area by laser trimming a linear region on the individual electrode and/or the portion of the common electrode, said linear region having a length and a width appropriate to achieve a specified amount of decrease.

9. A method as claimed in claim 7, wherein an individual electrode and/or a portion of the common electrode is decreased in area by laser trimming dot regions on the individual electrode and/or the portion of the common electrode, said dot regions being appropriate in size and number to achieve a specified amount of decrease.

10. A method as claimed in claim 7, wherein an individual electrode and/or a portion of the common electrode is decreased in area by laser trimming a circular region on the individual electrode and/or the portion of the common electrode, said circular region having a diameter appropriate to achieve a specified amount of decrease.

11. A method as claimed in claim 7, wherein said specified value is determined in accordance with a minimum measured quantity of light transmitted through said shutter elements.

* * * * *